(12) United States Patent
Andreasson et al.

(10) Patent No.: US 10,835,971 B2
(45) Date of Patent: Nov. 17, 2020

(54) CROSS-CUTTING CIRCULAR SAW DEVICE AND A METHOD OF CROSS-CUTTING AN OBJECT BY A CIRCULAR DEVICE

(71) Applicant: IKEA SUPPLY AG, Pratteln (CH)

(72) Inventors: Bengt Andreasson, Torslanda (SE); Tomas Andreasson, Torslanda (SE)

(73) Assignee: IKEA Supply AG, Pratteln (CH)

( * ) Notice: Subject to any disclaimer, the term of this patent is extended or adjusted under 35 U.S.C. 154(b) by 0 days.

(21) Appl. No.: 15/767,602

(22) PCT Filed: Oct. 13, 2016

(86) PCT No.: PCT/SE2016/050985
§ 371 (c)(1),
(2) Date: Apr. 11, 2018

(87) PCT Pub. No.: WO2017/065679
PCT Pub. Date: Apr. 20, 2017

(65) Prior Publication Data
US 2018/0290222 A1    Oct. 11, 2018

(30) Foreign Application Priority Data
Oct. 14, 2015    (SE) .................................... 1551326

(51) Int. Cl.
  B23D 47/12    (2006.01)
  B27B 5/075    (2006.01)
  (Continued)

(52) U.S. Cl.
  CPC ......... B23D 47/123 (2013.01); B23D 45/021 (2013.01); B23D 47/02 (2013.01);
  (Continued)

(58) Field of Classification Search
  CPC ............... Y10T 83/778; Y10T 83/7797; Y10T 83/7801; Y10T 83/7805; Y10T 83/7788;
  (Continued)

(56) References Cited

U.S. PATENT DOCUMENTS 1,635,290 A * 7/1927 Skoglund ............. B23D 47/025
                                                              83/473
1,645,924 A * 10/1927 Palmigiano, Jr. .... B23D 45/105
                                                              125/12
(Continued)

FOREIGN PATENT DOCUMENTS

CN     202212647 U    5/2012
DE       2405837 A1    8/1975
(Continued)

OTHER PUBLICATIONS

International Search Report and Written Opinion for PCT/SE2016/050985, dated Dec. 9, 2016.
(Continued)

Primary Examiner — Laura M Lee
(74) Attorney, Agent, or Firm — Merchant & Gould P.C.

(57) ABSTRACT

A cross-cutting circular saw device comprising:
  a frame (1);
  a guide (10) carried by the frame (1) and adapted to span an object (5) to be cross-cut by sawing;
  a carriage (3) mounted for reciprocal movement along the guide (10);
  at least one circular saw blade (4A, 4B) carried by the carriage (3);
  a motor (11) for moving the carriage (3) and rotating said at least one saw blade (4A, 4B), said motor (11) being fixed to the frame (1);
  a first transmission (2) arranged between the motor (11) and the carriage (3) for transforming an output of the motor to a reciprocating movement of the carriage (3) along the guide (10); and
  (Continued)

a second transmission (8, 9) arranged between the carriage (3) and the at least one saw blade (4A, 4B) for transforming the reciprocating movement of the carriage (3) to a rotation of said at least one saw blade (4A, 4B).

23 Claims, 4 Drawing Sheets (51) Int. Cl.
*B27B 5/065* (2006.01)
*B23D 45/02* (2006.01)
*B23D 47/02* (2006.01)

(52) U.S. Cl.
CPC .............. *B23D 47/12* (2013.01); *B27B 5/065* (2013.01); *B27B 5/075* (2013.01); *Y10T 83/778* (2015.04); *Y10T 83/7788* (2015.04); *Y10T 83/7805* (2015.04)

(58) Field of Classification Search
CPC . B26D 1/185; B26D 1/18; B26D 5/08; B26D 5/02; B27B 5/184; B27B 5/187; B27B 5/065; B27B 5/18; B23D 45/021; B23D 45/105; B23D 45/10; B23D 47/12; B23D 47/123
USPC .................. 83/622, 495, 614, 483–493, 578; 144/376
See application file for complete search history.

(56) References Cited

U.S. PATENT DOCUMENTS

| | | | | |
|---|---|---|---|---|
| 1,826,222 A | * | 10/1931 | Peterson | B23D 47/08 105/163.1 |
| 1,924,162 A | | 8/1933 | Mason | |
| 2,727,571 A | * | 12/1955 | Sayles | B26D 1/185 270/30.08 |
| 2,846,005 A | * | 8/1958 | Wilson | B26D 1/205 83/484 |
| 3,207,016 A | * | 9/1965 | Huff | B23D 45/021 83/471.2 |
| 3,213,907 A | * | 10/1965 | Pappas | B23D 45/021 83/176 |
| 3,757,618 A | * | 9/1973 | Kuts | B26D 1/0006 83/471.3 |
| 4,334,450 A | * | 6/1982 | Benuzzi | B23D 45/105 83/471.2 |
| 4,355,794 A | * | 10/1982 | Costigan | B65H 45/103 270/30.09 |
| 5,001,955 A | * | 3/1991 | Fujiwara | B26D 1/205 83/488 |
| 5,148,732 A | * | 9/1992 | Striebig | B23D 45/10 144/3.1 |
| 10,144,143 B2 | * | 12/2018 | Firth | B23D 47/02 |
| 2005/0268765 A1 | | 12/2005 | Chien | |
| 2010/0326252 A1 | | 12/2010 | Benuzzi | |

FOREIGN PATENT DOCUMENTS

| | | | | |
|---|---|---|---|---|
| DE | 3638777 A1 | | 5/1988 | |
| DE | 4114895 A1 | * | 11/1992 | .......... B23D 45/105 |
| FR | 2846199 A1 | | 4/2004 | |
| GB | 123700 A | * | 3/1919 | .............. B23Q 5/40 |
| GB | 770143 A | | 3/1957 | |
| GB | 2201625 A | | 9/1988 | |
| SU | 245324 | | 6/1969 | |
| SU | 889427 | | 12/1981 | |
| WO | WO 2009/095885 A1 | | 8/2009 | |

OTHER PUBLICATIONS

Search Report for European Patent Application No. 16855850.0, dated Apr. 11, 2019.
Chinese Office Action for corresponding CN Application No. 2019119021479600 dated Nov. 22, 2019 (19 pages), English translation included.
Russian Search Report for RU Application No. 2018115325/10 dated Dec. 27, 2019 (2 pages).

* cited by examiner

CROSS-CUTTING CIRCULAR SAW DEVICE AND A METHOD OF CROSS-CUTTING AN OBJECT BY A CIRCULAR DEVICE

This application is a National Stage Application of PCT/SE2016/050985 filed 13 Oct. 2016, which claims benefit of Swedish Patent Application No. 1551326-0, filed 14 Oct. 2015, which applications are incorporated herein by reference. To the extent appropriate, a claim of priority is made to each of the above disclosed applications.

TECHNICAL FIELD

The present invention relates to a cross-cutting circular saw device. The present invention further relates to a method of cross-cutting an object.

BACKGROUND ART

In furniture manufacturing, for example, low weight board elements are widely used. Such elements may comprise a hollow body enclosing a lightweight filling material. Such low weight board elements can be used as building elements, door panels, and as a large number of different furniture elements, such as furniture elements of cabinets, wardrobes, book shelves, table tops etc. For example, such board elements may include two sheets of a low weight, environmentally friendly and inexpensive material such as fibrous board having a thickness of about 2 millimeters forming the two faces of the board element and spaced apart by spacing elements. The spacing elements may include board strips having a thickness of about 2 mm and a width of about 14 to about 18 mm standing on their longitudinal edges parallel to the length of the sheet. The spacing elements may also include solid block or pad members, e.g. to permit attachment screws to penetrate and be firmly anchored therein, and laths provided along each edge of the panel. Such laths can be produced by gluing together board strips of the kind described above, and the solid block or pad members can be produced by cutting the laths to pieces of a predetermined length and gluing them together to form the solid block or pad members. Of course, the board elements could also be of other dimensions and also of other types, including for example chip board and particle board elements.

Existing machinery for sawing board elements, laths and/or pads present one or more disadvantages, e.g. that most existing machines require relatively much power to operate at a high production level and/or have a functional set-up that makes it difficult to keep a high production level, and require two motors, one for rotating the saw blade and one for moving the rotating saw blade across the object to be cut.

SUMMARY OF THE INVENTION

The object of the present invention is to provide a cross-cutting circular saw device that minimizes at least one of the above disadvantages.

In accordance with the present invention, this object is achieved in that the cross-cutting circular saw device comprises:
  a frame;
  a guide carried by the frame and adapted to span an object to be cross-cut by sawing;
  a carriage mounted for reciprocal movement along the guide;
  at least one circular saw blade carried by the carriage;
  a motor for moving the carriage and rotating said at least one saw blade, said motor being fixed to the frame;
  a first transmission arranged between the motor and the carriage for transforming an output of the motor to a reciprocating movement of the carriage along the guide; and
  a second transmission arranged between the carriage and the at least one saw blade for transforming the reciprocating movement of the carriage to a rotation of said at least one saw blade.

Thanks to the invention merely one motor may be used to power the machinery. Further the technical solution provides reliable and secure operation. A single motor may provide both the reciprocating movement of the carriage and the rotation of the at least one saw blade. Thereby the complexity of the saw device is reduced. Furthermore, the weight of the carriage is reduced, since the single motor is mounted on the frame.

Preferably, said at least one saw blade comprises a first circular saw blade and further comprises an additional second circular saw blade carried by the carriage. Said first and second saw blades are mounted in tandem with each other, and they are both, at least occasionally, rotated by the second transmission.

Thanks to this solution many advantages may be gained, e.g. cutting in both directions (i.e. back and forth), and ability to always use a cut down milling of the front blade, etc. The two saw blades preferably have identical thickness, more preferably the two saw blades are of identical type. Thanks to this feature the trailing saw blade may follow without any substantial resistance in the already cut groove.

According to a preferred embodiment the saw blade/-s is/are connected to its drive shaft via a free wheel device, such that the respective saw blade may only forcibly be driven in one direction, preferably its sawing direction, enabling powering one blade at a time, using one and the same main transmission/motor. Preferably, the free wheel device is a free wheel hub arranged on the carriage, between the drive shaft of the saw blade and the transmission device, such as the sprocket or pulley, being in contact with a power transmitting element. This provides for an energy efficient and low weight arrangement.

More preferably, there are a first and a second saw blade that are mounted in tandem with each other, and each of the saw blades is connected to a free wheel drive, meaning that each saw blade is only driven when being in position as the leading saw blade, and being driven in its sawing direction, meaning that the saw blade being in position as trailing saw blade is idle rotating in its sawing direction, which rotational direction is opposite to that of the leading saw blade. An advantage of this embodiment is that when the carriage changes direction of movement, and thereby also changes from, e.g., driving the first saw blade to driving the second saw blade, the second saw blade, now to become the leading saw blade, is already rotating/idling in its intended sawing direction and therefore accelerating the second saw blade to its intended rotational speed becomes much faster and requires much less power, compared to if it had been necessary to change the rotational direction of the second saw blade. Hence, each saw blade is always rotating in its intended sawing direction, and is driven when in position as leading saw blade, and idling in the same rotational direction when in position as trailing saw blade.

Alternatively the first saw blade is mounted so as to rotate in its sawing direction when the first saw blade is the leading saw blade of the carriage and to rotate in a non-sawing direction when the first saw blade is the trailing saw blade. Similarly, the second saw blade is mounted so as to rotate in its sawing direction when the second saw blade is the leading saw blade of the carriage and to rotate in a non-sawing direction when the second saw blade is the trailing saw blade, i.e. both saw blades are forcibly driven in both directions of carriage movement and the two saw blades are always rotating in the same direction. This alternative, which may be advantageous in some applications, takes away the need for using free wheel devices, although requiring a motor of larger power.

The first transmission may be a mechanical, hydraulic, pneumatic or electric transmission to cause the carriage to reciprocate along the guide, but most preferably it is a first mechanical transmission.

The motor has an output shaft, and as an example, the first mechanical transmission may include mechanically operated rods, but preferably the first mechanical transmission includes a reciprocal chain or belt having two ends attached to the carriage, and at least two wheels in operative contact with the reciprocal chain or belt, of which wheels at least one wheel, which preferably is a sprocket or toothed pulley, is fixed to the output shaft, while the other wheel is mounted rotary on the frame, so that a rotation of the output shaft causes a movement of the carriage along the guide.

The second transmission suitably includes:
  a power transmitting element, such as a friction and/or form element, such as a chain, a rack, preferably a geared rack, or a belt, preferably a toothed belt, fixed to the frame and extending along the guide; and
  a transmission device, such as a friction and/or form operated transmission device, such as a sprocket, or a pulley, such as a toothed pulley, mounted on the carriage in driving contact with the power transmitting element and operatively connected to said at least one saw blade, so that a movement of the carriage along the guide causes the transmission device to be driven by the power transmitting element and thereby rotate said at least one saw blade.

Suitably, the second transmission further includes a gearing, operatively connected between said at least one saw blade and the friction and/or form operated transmission device mounted on the carriage, said gearing providing a suitable rotational speed for said at least one saw blade. To easily achieve the desired rotary speed of said at least one saw blade, the gearing preferably is a planetary gearing.

The second transmission further preferably includes at least one guide roller carried by the carriage for guiding the power transmitting element, which has the shape of a belt or chain, such that the power transmitting element wraps a circumferential portion of the transmission device, which has the form of a sprocket or pulley, mounted on the carriage.

It is also suitable that the guide has an acceleration section, where the carriage is accelerated, and the carriage first passes this acceleration section before arriving at the object to be cross-cut, implying that the saw blade has been powered to a desired rotational speed prior to start of cutting in the object.

Preferably, the carriage during its travel through the acceleration section reaches at least 50%, more preferably at least 75%, of full speed. An advantage of this embodiment is that it provides for accelerating the rotational speed of the saw blade/-s to a suitable speed for efficient cutting of the object to be cross cut.

For preventing a rotating saw blade to wound a person and also to prevent sawdust from spreading, the carriage preferably includes a housing surrounding a major portion of said at least one saw blade, said housing preferably having a sawdust outlet adapted to be connected to a suction device for removing sawdust.

The saw device is suitable for cutting various types of board elements, including but not limited to hollow board elements, chip board elements, particle board elements, solid wood board elements, plywood board elements, fiber board elements, board elements made from combinations of several materials etc.

According to a further aspect of the present invention there is provided a method of cross-cutting an object by a circular saw device comprising a frame; a guide carried by the frame and adapted to span the object to be cross-cut by sawing; a carriage mounted for reciprocal movement along the guide; and at least one circular saw blade carried by the carriage, the method comprising:
  moving the carriage along the guide by a motor being fixed to the frame and a first transmission arranged between the motor and the carriage, the first transmission transforming an output of the motor to a reciprocating movement of the carriage along the guide; and
  transforming the reciprocating movement of the carriage to a rotation of said at least one saw blade by a second transmission arranged between the carriage and the at least one saw blade. This method provides for efficient and fast cross-cutting of objects.

BRIEF DESCRIPTION OF THE DRAWINGS

In the following, the invention will be described in more detail with reference to preferred embodiments and the appended drawings.

MODE(S) FOR CARRYING OUT THE INVENTION

Figure 1:
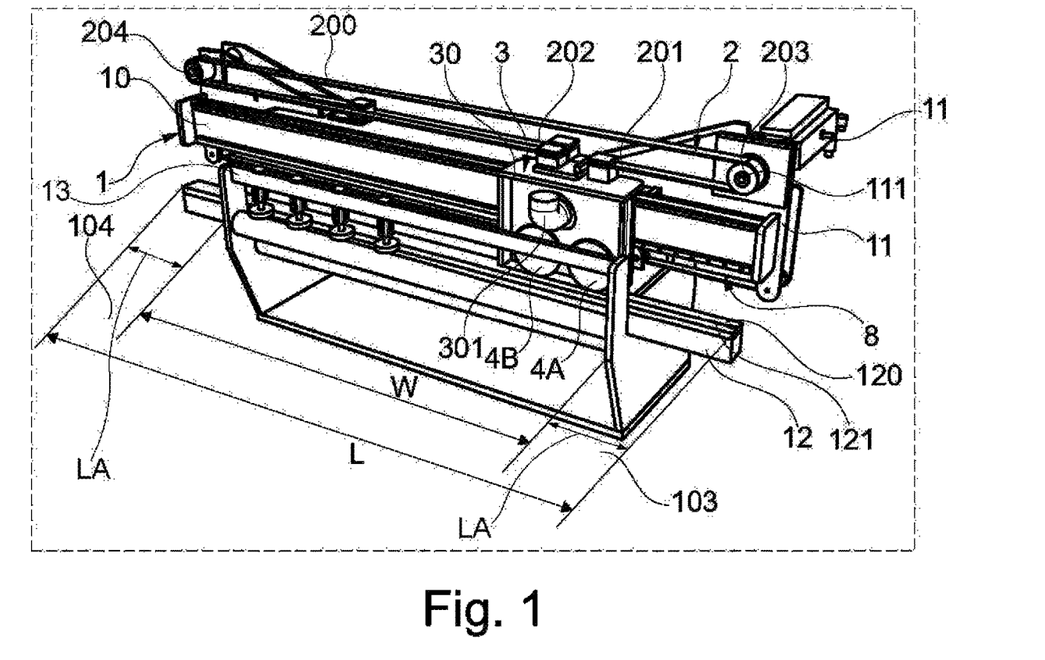
FIG. 1 is a perspective view of a preferred embodiment of a cross-cutting circular saw device in accordance with the present invention and viewed from the feed side.
Figure 2:
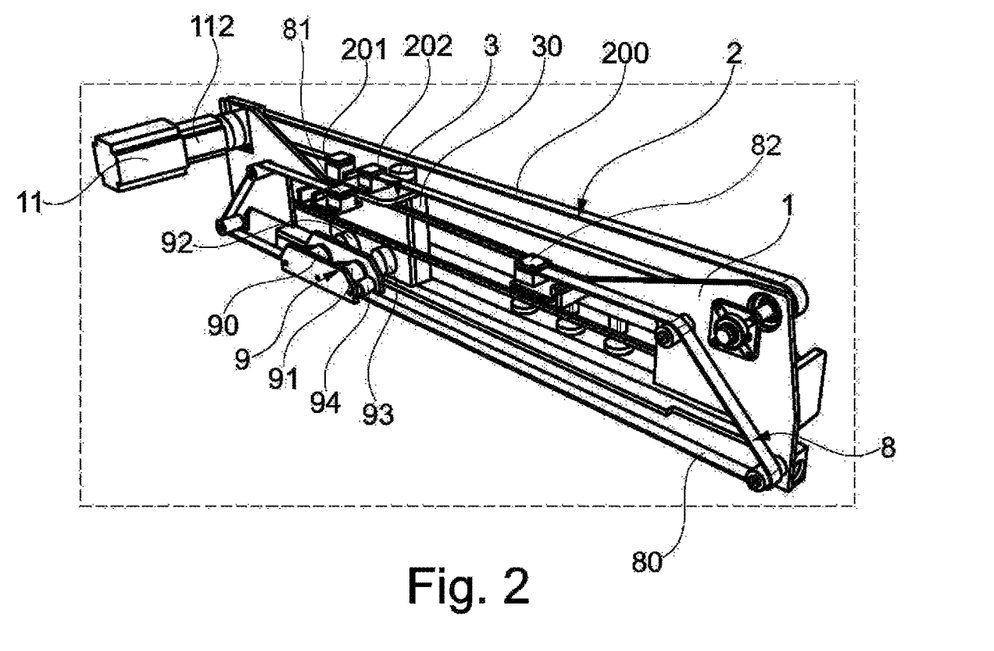
FIG. 2 is a perspective view of the saw device of FIG. 1 as viewed from an opposite direction and with some components not shown for better clarity.

FIG. 1 shows a preferred embodiment of a cross-cutting circular saw device in accordance with the present invention. The saw device comprises a frame 1, a guide 10 carried by the frame 1 and adapted to span an object 5 (shown in FIG. 4) to be cross-cut by sawing, a carriage 3 mounted for reciprocal movement along the guide 10, at least one circular saw blade 4A, 4B carried by the carriage 3, and a motor 11 for moving the carriage 3 and rotating said at least one saw blade 4A, 4B, said motor 11 being fixed to the frame 1. The saw device further comprises a first transmission 2 and a second transmission 8, 9. As is best shown in FIG. 2, the first transmission 2 is arranged between the motor 11 and the carriage 3 for transforming an output of the motor 11 to a reciprocating movement of the carriage 3 along the guide 10, and the second transmission 8, 9 is arranged between the carriage 3 and the at least one saw blade 4A, 4B for transforming the reciprocating movement of the carriage 3 to a rotation of said at least one saw blade 4A, 4B.

Figure 4:
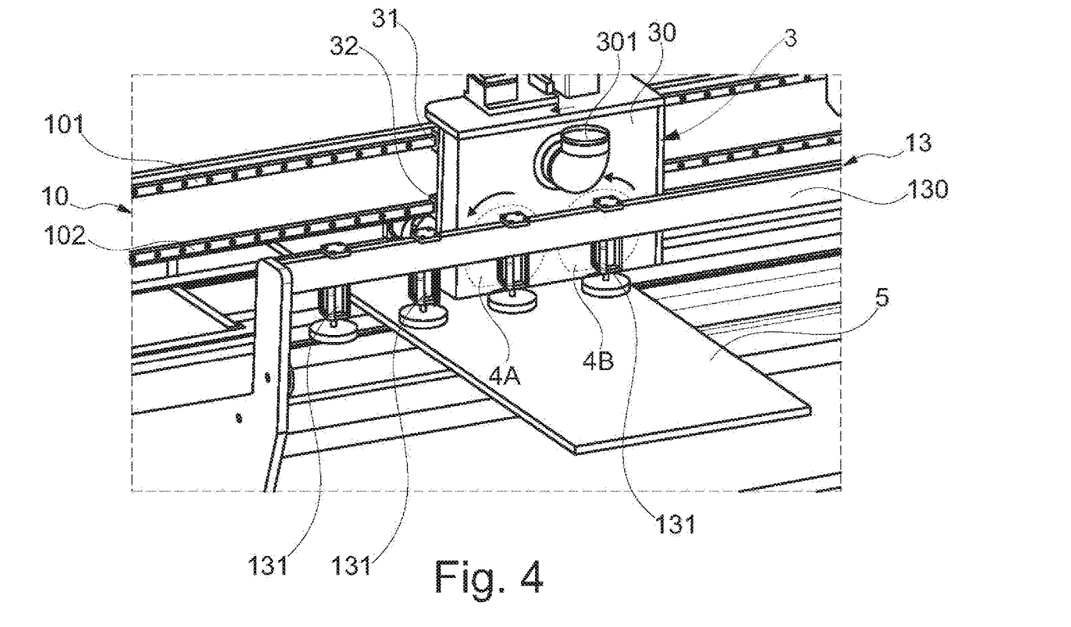
FIG. 4 is a perspective view showing from another angle a firmly held object being cut by the saw blade carried by the travelling carriage that has a suction outlet for removing sawdust.
Figure 5:
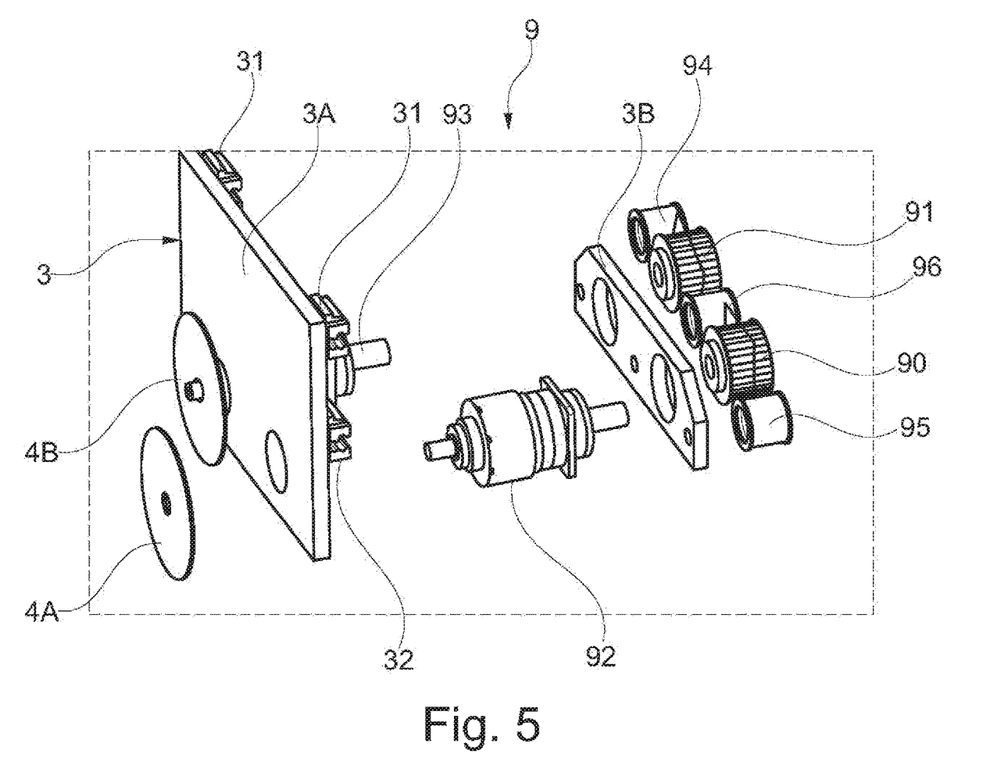
FIG. 5 is an exploded view of some of the components of the second transmission and the two circular saw blades.

The guide 10 includes two parallel guide rails, an upper one 101 and a lower one 102 best shown in FIG. 4. FIGS. 4 and 5 show that the carriage 3 has at least one upper guide follower 31 cooperating with the upper guide rail 101, and at least one lower guide follower 32 cooperating with the lower guide rail 102 to permit the carriage 3 to travel along a predetermined path along the guide 10 and across the object 5 to be cross-cut.

Circular saw blades have been in use for a long time and generally consist of a circular disk with cutting teeth formed into or attached to the periphery of the disk and a bore formed at the center of the disk to allow the mounting of the blade on a rotary driven shaft. A circular saw blade includes a generally circular blade portion and a plurality of spaced apart teeth extending outwardly from the circular blade portion. Each tooth has a leading edge and usually a positive rake. A tooth that is swept in the intended direction of rotation (that is inclined in the direction of rotation) is said to have a positive rake, a tooth that exhibits no inclination is said to have no rake and a tooth that exhibits inclination opposite to the direction of rotation is said to have a negative rake. Usually the positive rake is in a range of between about 20 and about 45 degrees, and a saw blade can perform its sawing function only when rotating in the intended sawing direction.

Said at least one saw blade 4A, 4B may be a symmetrical blade (not shown), where the leading edge and the trailing edge are of identical shape and both edges can be used for cutting independently of the direction of rotation of the saw blade. Such a saw blade can cut the object 5 both during the first stroke of the carriage 3, when the saw blade rotates in a first direction, and during the return stroke of the carriage 3, when the saw blade rotes in an opposite direction. Even though such symmetrical saw blades can be used, it is often more preferred to use saw blades where each tooth has a positive rake and the shape of a breaking wave, which results in better cutting properties, such saw blades being of asymmetrical shape and having one specific sawing direction in which they have the proper function of sawing. When using a single saw blade of such asymmetrical shape the saw blade may typically perform its sawing function in the first stroke of the carriage 3, but such asymmetrical saw blade is not suitable for sawing in the return stroke of the carriage, meaning that the return stroke of the carriage 3 would be performed without contact with any object to be cross-cut.

Consequently, in the most preferred embodiment shown in the drawings, said at least one saw blade 4A, 4B comprises a first circular saw blade 4A and an additional second circular saw blade 4B, both of which are carried by the carriage 3. The first and second saw blades 4A, 4B are mounted in tandem with each other, and during a first working stroke of the carriage 3 they are being rotated by the second transmission 8, 9 together and in a first direction, while during a reverse stroke of the carriage 3 the saw blades 4A, 4B are caused to rotate in a second direction being opposite to the first direction.

The two saw blades preferably are identical and the first saw blade 4A is mounted so as to rotate in its sawing direction when the first saw blade 4A is the leading saw blade of the carriage 3 and in a non-sawing direction when the first saw blade 4A is the trailing saw blade, and similarly, the second saw blade 4B is mounted so as to rotate in its sawing direction when the second saw blade 4B is the leading saw blade of the carriage 3 and in a non-sawing direction when the second saw blade 4B is the trailing saw blade. Hence, the first and second saw blades 4A, 4B may be of identical type, but are mounted opposite to each other on the carriage 3. It will be appreciated that the saw blade being the trailing saw blade will travel in the cut track made by the leading saw blade, meaning that the trailing saw blade will have little or no contact with the object 5 to be cut. In the instance illustrated in FIG. 4 the first saw blade 4A is the leading saw blade and rotates in its sawing direction, counter-clockwise direction in FIG. 4, while the second saw blade 4B is the trailing saw blade and also rotates in counter-clockwise direction, which is a direction opposite to the sawing direction of second saw blade 4B, the second saw blade 4B travelling in a cut track formed by the first saw blade 4A in the object 5.

The motor 11 has an output shaft 111 (FIG. 1) and a reduction gearing 112 (FIG. 2) to reduce the rotational speed of the output shaft 111, so that a desired travelling speed of the carriage 3 can be obtained. The first transmission 2 may be a hydraulic, pneumatic or electric transmission, for example, but suitably it is a mechanical transmission. As an example, hydraulically or mechanically operated rods (not shown) could be used for pushing the carriage 3 back and forth, but as is best shown in FIGS. 1 and 2 the first mechanical transmission 2 preferably includes a reciprocal chain or belt 200 having two ends 201, 202 attached to the carriage 3, and at least two wheels 203, 204 in operative contact with the reciprocal chain or belt 200, of which wheels 203, 204 at least one wheel 203, which preferably is a sprocket or toothed pulley, is fixed to the output shaft 111, while the other wheel 204 is mounted rotary on the frame 1, so that a rotation of the output shaft 111 causes a movement of the carriage 3 along the guide 10.

Figure 3:
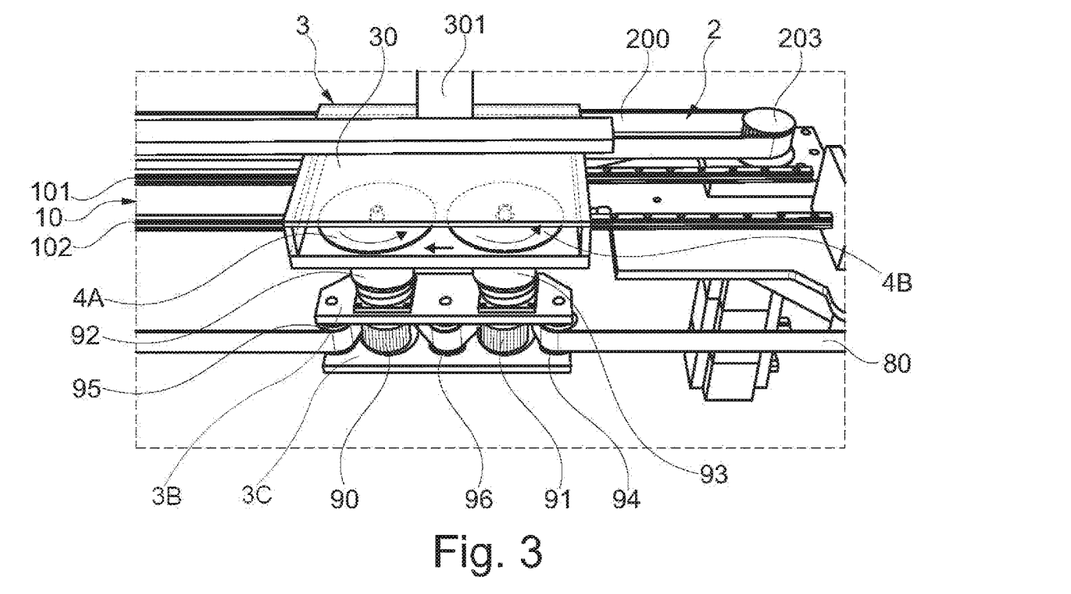
FIG. 3 is a perspective view showing a travelling carriage, parts of the first and second transmissions, and two circular saw blades arranged in tandem.

As is best shown in FIGS. 2 and 3, the second transmission 8, 9 preferably includes:
  a friction and/or form element 80 (hereinafter mostly referred to as power transmitting element), such as a chain, a rack, preferably a geared rack, or a belt, preferably a toothed belt, which friction and/or form element 80 is able to transmit power by its friction and/or by its form, fixed to the frame 1 and extending along the guide 10, for example the power transmitting element, e.g. the belt 80 illustrated in FIG. 2, may be fixed to the frame 1 at attachment points 81 and 82, and
  a friction and/or form operated transmission device 90, 91, such as a sprocket, or a pulley, such as a toothed pulley 90, 91, or preferably a pair of sprockets or pulleys, mounted on the carriage 3 in driving contact with the power transmitting element 80 and operatively connected to said at least one saw blade 4A, 4B, so that a movement of the carriage 3 along the guide 10 causes the friction and/or form operated transmission device 90, 91 to be driven, e.g. the sprockets or pulleys 90, 91 are rotated, by the power transmitting element 80 and thereby the friction and/or form operated transmission device 90, 91 rotate/-s the respective saw blade 4A, 4B.

Further, the second transmission 8, 9 suitably includes a gearing 92, 93 best shown in FIGS. 3 and 5 operatively connected between said at least one saw blade 4A, 4B and the transmission device 90, 91 mounted on the carriage 3, said gearing 92, 93 providing a suitable rotational speed for said at least one saw blade 4A, 4B. The gearing preferably is a planetary gearing 92, 93 for obtaining a desired rotational speed of said at least one saw blade 4A, 4B.

As is best shown in FIGS. 3 and 5, the second transmission 8, 9 further includes guide rollers 94, 95, 96 carried by the carriage 3 for guiding the power transmitting element 80, which has the shape of a belt or chain, such that the power transmitting element 80 wraps a circumferential portion of the transmission device 90, 91, which in a preferred embodiment has the form of a sprocket or pulley 90, 91, mounted on the carriage 3.

As is best shown in FIG. 5, the carriage 3 includes a large front plate 3A and a smaller first rear plate 3B adapted to receive an output end and an input end, respectively, of the planetary gearings 92 and 93. The input ends of the planetary gearings 92 and 93 have input shafts, on which the sprockets or pulleys 90, 91 are mounted. A second rear plate 3C, see FIG. 3, similar to the first rear plate 3B may be located on the opposite side of the sprockets or pulleys 90, 91 to provide a space between the two rear plates 3B, 3C for housing the sprockets or pulleys 90, 91 and the guide rollers 94, 95, 96. The large front plate 3A of the carriage 3 also carries the guide followers 31, 32, as best illustrated in FIG. 5. Furthermore, the first and second saw blades 4A, 4B are mounted to the respective planetary gearing 92, 93 at an opposite side, compared to that of the gearings 92, 93, of the large front plate 3A.

Referring to FIG. 1, the guide 10 has a total length L along which the carriage 3 may travel during its reciprocating movement, and the saw device has a width W within which objects 5 to be cross-cut can be placed, the width W being smaller than the total length L. At each lateral end the guide 10 has an acceleration section 103, 104, where the carriage 3 is accelerated, so that the carriage 3 first passes this acceleration section 103, 104 before arriving at the object 5. Accelerating the carriage 3 results in accelerating the rotational speed of the saw blades 4A, 4B, since the saw blades 4A, 4B are driven by the movement of the carriage 3 along the power transmitting element 80. The length LA of the respective acceleration section 103, 104 is substantially equal to the length L minus the width W and then divided by 2; $LA=(L-W)/2$. The length LA suitably is such that the carriage 3 during its travel through the acceleration section 103, 104 will reach at least 50%, more preferably at least 75%, of full speed.

Figure 6:
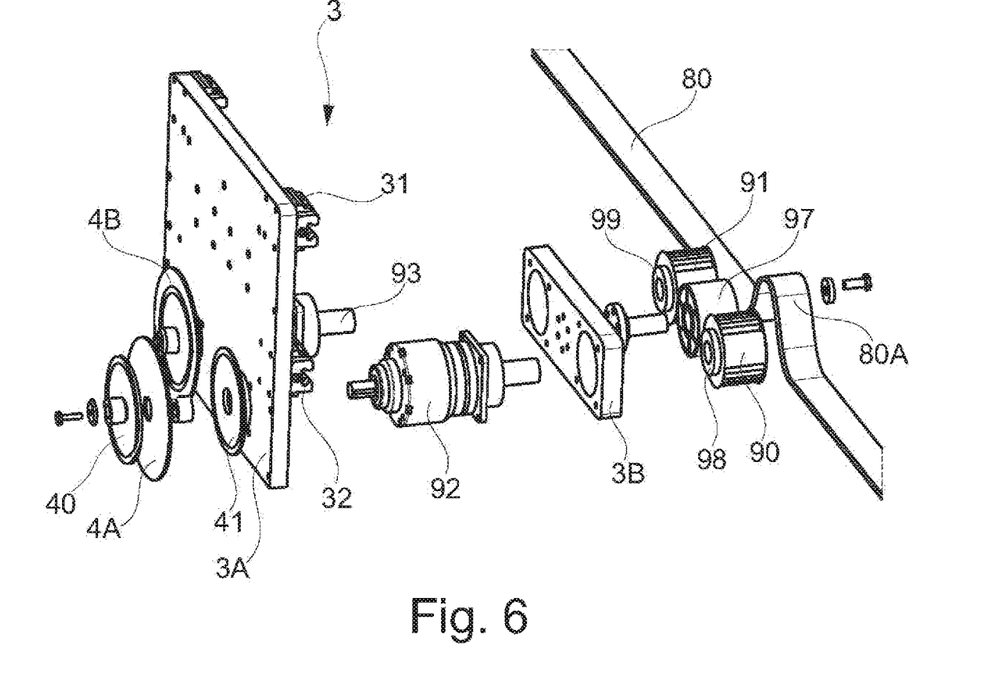
FIG. 6 is an exploded view of some of the components of the second transmission and the circular saw blades, according to a second embodiment.
Figure 7:
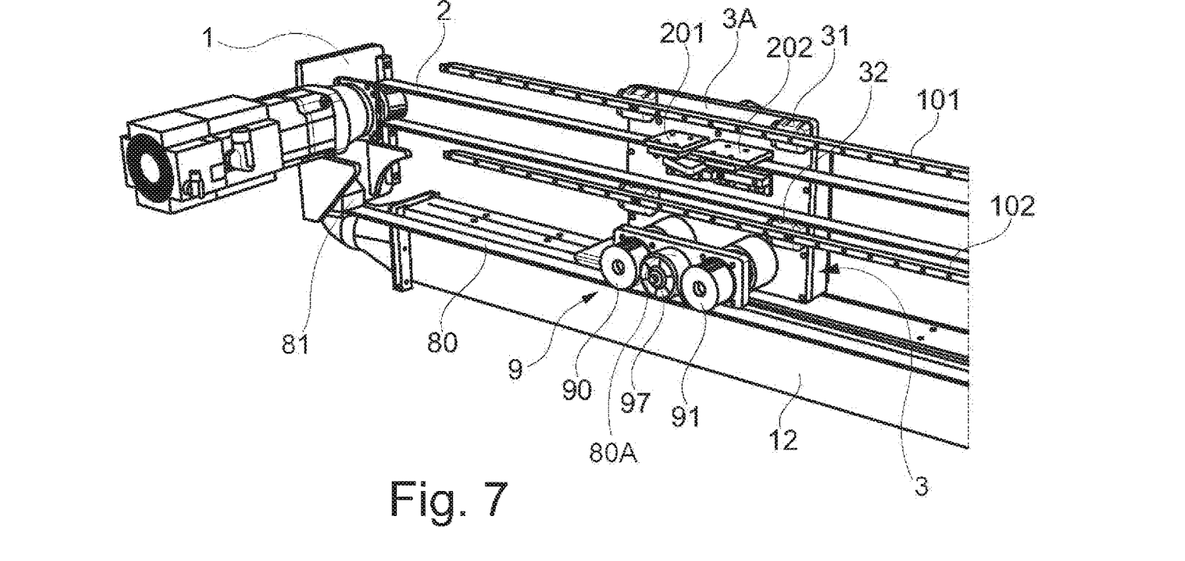
FIG. 7 is a perspective view showing a travelling carriage similar to FIG. 3, with components as presented in FIG. 6.

In FIGS. 6 and 7 there are shown views similar to what is also shown in FIGS. 3 and 5, but presenting an alternative embodiment. In the following merely the differing details/components will be focused upon, due to the fact that most details are the same as already described in connection with FIGS. 3 and 5. In the exploded view in FIG. 6 it is shown that a similar kind of power transmitting element 80 as presented in FIGS. 3 and 5 is being used and arranged for rotation of the saw blades 4A, 4B, which preferably are clamped between two clamping plates 40, 41. According to this second embodiment there is only one guiding roller 97 arranged between the power transmitting element, e.g. the belt or chain 80, and the friction and/or form operated transmission devices, e.g. the sprockets or pulleys 90, 91. This is achieved by having the power transmitting element 80 to contact the transmission devices 90, 91 at their lower peripheries and making the power transmitting element 80 follow an upside-down U-shaped pathway 80A to follow up and around the guide roller 97, which is positioned between the two transmission devices 90, 91. Thanks to this arrangement merely one guide roller 97 may suffice, i.e. reducing the number of elements in the equipment to thereby save cost and reduce complexity. It is evident for the skilled person that in some applications, where it is desired to have a larger contact area between the power transmitting element 80 and the transmission devices 90, 91, it may be preferred to use the arrangement as presented in FIGS. 3 and 5, despite the extra complexity. The power transmitting element 80, e.g. the belt 80 illustrated in FIG. 7, may be fixed to the frame 1 at two attachment points, of which only one attachment point 81 is illustrated in FIG. 7.

In the second embodiment there is shown a preferred concept of driving the saw blades 4A, 4B, i.e. by the use of free wheel devices 98, 99 arranged within the second transmission 8, 9, within a final part 9 of the transmission. In the shown embodiment the free wheel devices 98, 99, are arranged as free wheel hubs 98, 99 in the center of the transmission devices 90, 91. This arrangement merely allows powering of each saw blade 4A, 4B in one direction, i.e. allowing the first saw blade 4A to be powered in its sawing direction, e.g. to be powered for cut down milling in a first direction, when the first saw blade 4A is the leading saw blade, and allowing the second saw blade 4B to be powered in its sawing direction, e.g. to be powered for cut down milling in a second direction, when the second saw blade 4B is the leading saw blade. Thanks to this arrangement several advantages are gained. Firstly it saves energy by merely powering one saw blade at a time. Secondly it saves energy by allowing the freewheeling saw blade, i.e. that saw blade which is the trailing saw blade, to continue rotating in its "cutting direction", i.e. to continue rotating in its sawing direction, which is opposite to the direction of the leading saw blade, thereby requiring less energy input to accelerate the saw blade at each start of a new cutting stroke, in a reverse direction, since the saw blade is already freewheeling rotating in its intended cutting, i.e. sawing, direction before start of the acceleration. Hence, when viewed in the perspective of FIG. 7, the first saw blade 4A, driven by the pulley 90, is always rotating in counter-clockwise direction, and is driven when the carriage 3 is moved to the left, and is idling when the carriage 3 is moved to the right, wherein the second saw blade 4B, driven by the pulley 91, is always rotating in clockwise direction, and is idling when the carriage 3 is moved to the left and is driven when the carriage 3 is moved to the right.

As is best shown in FIGS. 3 and 4, the carriage 3 suitably includes a housing 30 surrounding a major portion of said at least one saw blade 4A, 4B, and it is also suitable that the housing 30 has a sawdust outlet 301 adapted to be connected to a suction device (not shown) for removing sawdust. FIG. 4 also shows a holder 13 for holding the object 5 to be cross-cut. The holder 13 comprises a plurality of vertical actuators 131 carried by a horizontal beam 130 spanning the width of the object 5. The actuators 131 may be operated electrically, hydraulically, pneumatically or even mechanically to press the object 5 against a suitable counter surface, such as a table or a beam 12 (best shown in FIG. 1), for example, having a longitudinal slot 121 for receiving a lower portion of the saw blade 4A, 4B during cutting.

INDUSTRIAL APPLICABILITY

The present invention is applicable primarily in furniture industry, for example when it is desirably to increase production by utilizing also the return stroke of a cross-cutting saw device for cutting the object to be cross-cut, and/or when it is desirable to use a single motor for both rotating the saw blade and traversing the saw blade over the object to be cut.

The invention claimed is:

1. A cross-cutting circular saw device comprising:
    a frame;
    a guide carried by the frame and adapted to span an object to be crosscut by sawing;
    a carriage mounted for reciprocal movement along the guide;
    at least one circular saw blade carried by the carriage;
    a motor for moving the carriage and rotating said at least one saw blade, said motor being fixed to the frame;
    a first transmission arranged between the motor and the carriage for transforming an output of the motor to a reciprocating movement of the carriage along the guide; and
    a second transmission arranged between the carriage and the at least one saw blade for transforming the reciprocating movement of the carriage to a rotation of said at least one saw blade.

2. A saw device as claimed in claim 1, wherein said at least one saw blade comprises a first circular saw blade and further comprises an additional second circular saw blade carried by the carriage, said first and second saw blades being mounted in tandem with each other, the two saw blades being at least occasionally rotated by the second transmission.

3. A saw device as claimed in claim 2, wherein the first saw blade is mounted so as to rotate in its sawing direction when the first saw blade is the leading saw blade of the carriage, and similarly, the second saw blade is mounted so as to rotate in its sawing direction when the second saw blade is the leading saw blade of the carriage.

4. A saw device as claimed in claim 1, wherein at least one free wheel device is arranged in the saw device to allow the at least one circular saw blade to be powered in one direction only.

5. A saw device as claimed in claim 4, wherein the at least one free wheel device is a respective free wheel hub arranged on the carriage and connected to the respective saw blade.

6. A saw device as claimed in claim 2, the two saw blades being rotated by the second transmission together and in a first direction upon moving the carriage in a first direction, said carriage during a reverse stroke causing the saw blades to rotate in a second direction being opposite to the first direction, preferably the first saw blade being mounted so as to rotate in its sawing direction when the first saw blade is the leading saw blade of the carriage and in a non-sawing direction when the first saw blade is the trailing saw blade, and similarly, the second saw blade being mounted so as to rotate in its sawing direction when the second saw blade is the leading saw blade of the carriage and in a non-sawing direction when the second saw blade is the trailing saw blade.

7. A saw device as claimed in claim 1, wherein the first transmission is a first mechanical transmission.

8. A saw device as claimed in claim 7, wherein the motor has an output shaft, and the first mechanical transmission includes a reciprocal chain or belt having two ends attached to the carriage, and at least two wheels in operative contact with the reciprocal chain or belt, wherein at least one of the at least two wheels is fixed to the output shaft, while another of the at least two wheels is mounted rotary on the frame, so that a rotation of the output shaft causes a movement of the carriage along the guide.

9. A saw device as claimed in claim 1, wherein the second transmission includes:
    a power transmitting element extending along the guide; and
    a transmission device mounted on the carriage in driving contact with the power transmitting element and operatively connected to said at least one saw blade, so that a movement of the carriage along the guide causes the transmission device to be driven by the power transmitting element and thereby rotate said at least one saw blade.

10. A saw device as claimed in claim 9, wherein the second transmission further includes a gearing, operatively connected between said at least one saw blade and the transmission device mounted on the carriage, said gearing providing a rotational speed for said at least one saw blade.

11. A saw device as claimed in claim 10, wherein the gearing is a planetary gearing.

12. A saw device as claimed in claim 9, wherein the second transmission further includes at least one guide roller carried by the carriage for guiding the power transmitting element, which has the shape of a belt or chain, such that the power transmitting element wraps a circumferential portion of the transmission device, which has the form of a sprocket or pulley, mounted on the carriage.

13. A saw device as claimed in claim 1, wherein the guide has an acceleration section, where the carriage is accelerated, and wherein the carriage first passes this acceleration section before arriving at the object.

14. A saw device as claimed in claim 13, wherein the carriage during its travel through the acceleration section reaches at least 50% of full speed.

15. A saw device as claimed in claim 1, wherein the carriage includes a housing surrounding a major portion of said at least one saw blade, said housing having a sawdust outlet adapted to be connected to a suction device for removing sawdust.

16. A saw device as claimed in claim 1, wherein the at least one circular saw blade comprises a leading saw blade, and wherein the second transmission is arranged to provide cut down milling in the object that is to be cross-cut, by means of the leading saw blade.

17. A method of cross-cutting an object by a circular saw device comprising:
    a frame;
    a guide carried by the frame and adapted to span the object to be crosscut by sawing;
    a carriage mounted for reciprocal movement along the guide; and
    at least one circular saw blade carried by the carriage, the method comprising:
    moving the carriage along the guide by a motor being fixed to the frame and a first transmission arranged between the motor and the carriage, the first transmission transforming an output of the motor to a reciprocating movement of the carriage along the guide; and
    transforming the reciprocating movement of the carriage to a rotation of said at least one saw blade by a second transmission arranged between the carriage and the at least one saw blade.

18. A saw device as claimed in claim 3, wherein the first saw blade and the second saw blade are of identical type.

19. A saw device as claimed in claim 4, wherein said one direction being the sawing direction of the at least one circular saw blade.

20. A saw device as claimed in claim 8, wherein the at least one of the at least two wheels is a sprocket or toothed pulley.

21. A saw device as claimed in claim 9, wherein the power transmitting element comprises a chain, a rack, or a belt.

22. A saw device as claimed in claim 9, wherein the transmission device comprises a sprocket or a pulley.

23. A saw device as claimed in claim 13, wherein the carriage during its travel through the acceleration section reaches at least 75% of full speed.

* * * * *